United States Patent
Siegwart

(10) Patent No.: US 6,550,823 B1
(45) Date of Patent: Apr. 22, 2003

(54) FLANGE CONNECTION FOR PIPES, IN PARTICULAR, AIR PIPES

(76) Inventor: Emil Siegwart, Michael-Blatter-Strasse 6, D-66280 Sulzbach (DE)

( * ) Notice: Subject to any disclaimer, the term of this patent is extended or adjusted under 35 U.S.C. 154(b) by 15 days.

(21) Appl. No.: 09/631,233

(22) Filed: Aug. 2, 2000

(30) Foreign Application Priority Data

Aug. 5, 1999 (DE) .......................................... 199 36 976

(51) Int. Cl.[7] .............................................. F16L 17/00
(52) U.S. Cl. ........................ 285/344; 285/424; 285/365
(58) Field of Search ................................. 285/344, 405, 285/424, 363, 365

(56) References Cited

U.S. PATENT DOCUMENTS

| | | | |
|---|---|---|---|
| 3,198,561 A | * 8/1965 | Witt | ........................... 285/344 |
| 4,133,566 A | 1/1979 | Miller | |
| 4,461,499 A | * 7/1984 | Hunter et al. | ................ 285/424 |
| 4,995,648 A | 2/1991 | Jackson | |
| 5,015,018 A | * 5/1991 | Arnoldt | ....................... 285/424 |
| 5,135,270 A | * 8/1992 | Arnoldt et al. | ............. 285/363 |

FOREIGN PATENT DOCUMENTS

| | | | |
|---|---|---|---|
| AT | 398335 | 3/1994 | |
| DE | 865885 | * 2/1953 | ................. 285/344 |
| DE | 1795519 | 9/1959 | |
| DE | 1834825 | 7/1961 | |
| DE | 2435252 | 2/1976 | |
| DE | 2758341 | * 6/1979 | ................. 285/344 |
| DE | 4227316 | 2/1994 | |
| EP | 0458062 | 11/1991 | |
| EP | 0596230 | 5/1994 | |

* cited by examiner

Primary Examiner—Lynne H. Browne
Assistant Examiner—Aaron Dunwoody
(74) Attorney, Agent, or Firm—Friedrich Kueffner

(57) ABSTRACT

A flange connection for pipes has a plug connection member having a pipe section and a flange connected to one end of the pipe section, wherein the pipe section has a mounting seat and a sealing seat. The plug connection member also has a first sealing ring seated in an initial position in the mounting seat, wherein the first sealing ring rolls from the mounting seat into the sealing seat and into a sealing position when the pipe section is inserted into a pipe end.

17 Claims, 2 Drawing Sheets

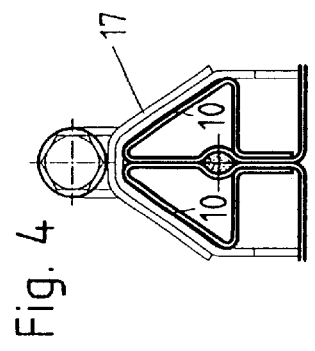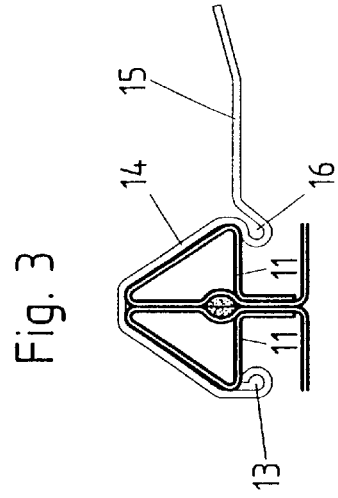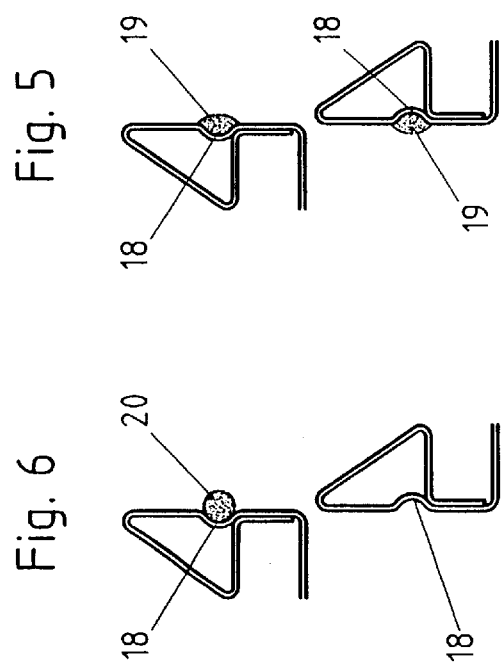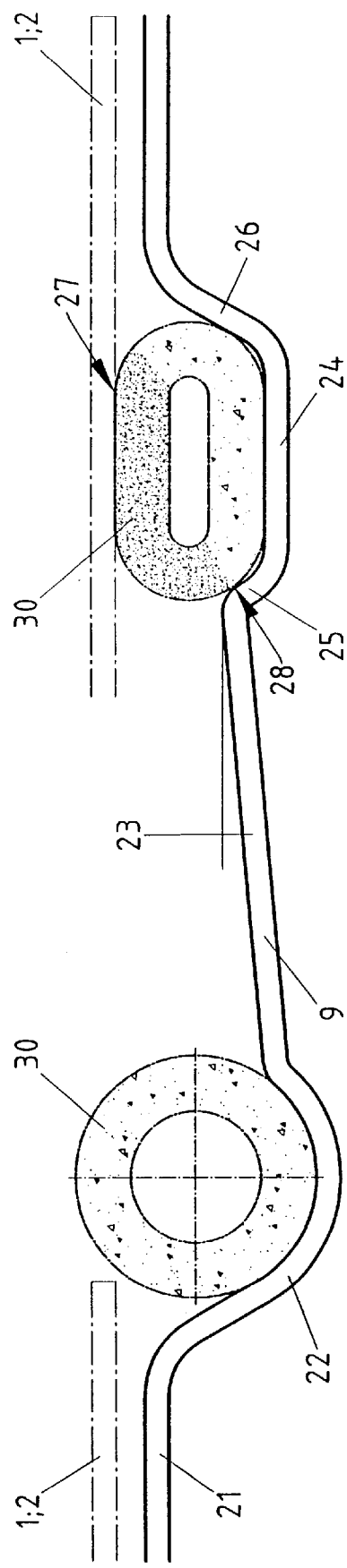

FLANGE CONNECTION FOR PIPES, IN PARTICULAR, AIR PIPES

BACKGROUND OF THE INVENTION

1. Field of the Invention

The invention relates to a flange connection for pipes, in particular, air pipes.

2. Description of the Related Art

The pipe systems for air are usually configured in many variations of pipes, often in the form of a folded spiral-seam pipes, of individual lengths determined by constructional conditions and of industrially pre-manufactured parts such as branch pipes, curved sections, transition sections between pipes of different diameters, and functional components such as shut-off flaps, throttle flaps, or volume flow regulators.

The required tightness of the corresponding connections demands precisely manufactured, high-quality pipes and parts. Even though, the assembly expenditure is proportionally a high component of the manufacturing costs.

In order to reduce the assembly work, plug connections have been developed, for example, as disclosed in EP 0 596 230 B1, that can be easily manipulated. A pipe section to be inserted into a pipe end is provided with a sealing ring of foamed material of, for example, 10 to 20 Shore hardness. When the pipe section is inserted, the sealing ring rolls from a mounting seat into a sealing seat, is compressed accordingly, and provides a sealing action.

The plug connection, however, requires a high working expenditure in the case of a retrofitting assembly because it requires an axial displacement of the pipes and parts.

The demounting and insertion of individual parts is simpler in the case of flange connections which, after detachment of the fastening means, allow a simple removal of the part in the transverse direction of the pipeline. However, flange connections entail the problem that during the first installation the pipe ends, especially the pipe ends of the individually installed pipes, must be provided with flanges. Pre-manufactured end pieces with flanges for a clamping insertion into the pipe ends are known, but have not found acceptance in practice.

SUMMARY OF THE INVENTION

It is an object of the present invention to provide a connection which overall is more assembly-friendly.

In accordance with the present invention, this is achieved in that a pipe section provided with a flange is embodied as a plug connection with a sealing ring which, during insertion into a pipe end, rolls from the mounting seat into the sealing seat.

For this purpose, the invention is based on a flange connection and provides that a pipe section provided with a flange is embodied as a plug connection with a sealing ring that rolls from a mounting seat into a sealing seat when the plug connection is inserted into the pipe end.

Accordingly, the connection is embodied twofold, i.e., as a flange connection as well as a plug connection. The initial mounting is thus significantly simplified in comparison to the previously employed simple flange connections. A retrofit mounting is possible in the aforementioned simple way that is made possible by the flange connection. This is especially advantageous for installing and removing of functional components for the now prescribed cleaning of pipe systems in certain time intervals by means of cleaning robots moved through the pipes.

Expediently, the flange has an essentially known configuration of a profiled sheet metal such that the flange widens from the outer edge radially inwardly to a step so that it can be connected with a counter flange of the same configuration by means of a clamping device in the form of a clamping bracket having a matching cross-section.

However, as a new configuration of the connection it is suggested according to the invention to use the aforementioned steps of the flanges for connecting, in a simpler way, clamps instead of the clamping bracket, wherein the clamps engage with their preferably eye-shaped ends like a hook under the two steps and preferably have a lateral projection in the form of a lever handle at one of its eye-shaped ends.

Furthermore, in the connection of simplifying assembly and ensuring a seal-tight connection, it is provided that the flanges have a circumferential groove, respectively, in their contact surfaces provided on their end faces and that a sealing ring is positioned in the two grooves facing one another. In one embodiment, the sealing ring is connected to one of the flanges. According to another embodiment, the sealing ring can also be comprised of two halves each connected to one of the flanges, respectively, wherein each half projects with a curved portion slightly from the groove past the contact surface.

In order to be able to employ the invention also for pipe diameters that are larger, especially above 300 mm up to 1000 mm or more, it is proposed according to the invention that the first sealing ring is comprised of a hose whose material has a hardness of more than 30 Shore.

The reason for this measure is explained in the following:

The sealing rings of the plug connection have, in addition to the sealing function, also an axial connecting function since they secure the inserted pipes and pipe parts in the axial direction against the axial forces caused by the pressure of the medium. The securing force, resulting from the pressing of the sealing ring against the pipe wall and from its frictional connection on the pipe wall, and the intrinsic resistance force of the sealing ring against rolling back are proportional to the length of the sealing ring and increase thus linearly with its diameter, while the axial force resulting from the pressure of the medium increases by the second power. The maximum possible pressing force and stiffness of the sealing ring and thus the resistance force against (back) rolling, relative to the unit of length, finally are no longer sufficient to generate the required retaining force. They are limited by the force to be exerted for performing the flex work required for rolling the sealing ring during the insertion of the plug connection member into the pipe end, and this force increases in any case linearly with the diameter even for a pressing force and stiffness that remain the same.

For the same pressing force against the pipe wall, the hose according to the invention, which has in its center a hollow space, rolls more easily along the pipe wall than the cellular rubber or similar closed-cell foamed materials that have been used for the sealing ring in the past, which however otherwise completely fill the cross-sectional area of the sealing ring with foamed material, i.e.,, there is no central hollow space as in the hose. After locking in the sealing seat, however, the sealing ring according to the invention resists a return movement to a much greater degree than the foam. The hose wall, which in itself is comprised of a stiffer material, forms between its support on the pipe wall by friction and a direct support against one of the sidewalls of the sealing seat formed as a groove a stiffer supporting element, acting mechanically at a slant and with a substantial component in the axial direction, than the corresponding cross-sectional portion of the foamed material can provide. The solid material (not foamed, no cells) of the hose wall is also more reliable than the more or less inhomogeneous foamed material.

Suitable parameter combinations for achieving the aforementioned effects can be determined by routine tests.

The material of the hose should expediently have a hardness of 40 to 70 Shore, preferably 50 to 60, Shore.

The wall thickness of the hose should be, in general, dimensioned suitably when it is 20 to 25% of the hose diameter.

The sealing seat is preferably embodied as a groove formed in the pipe section with preferably a flat bottom and with a sidewall across which the sealing ring rolls during insertion into the pipe end. The height of the sidewall is 25 to 30% of the height of the compressed sealing ring.

The other sidewall of the groove which, preferably, together with the first sidewall, surrounds and contacts the sealing ring, is higher than the first sidewall, preferably approximately twice as high.

Expediently, the sealing ring is compressed in the sealing seat to a height of 55 to 70%, preferably 60 to 65%, of its original diameter.

The aforementioned surrounding (embracing) of the sealing ring by the sidewalls contacting it contributes significantly to the stabilization of the sealing ring in its compressed form in the sealing seat.

The mounting seat of the sealing ring is preferably defined by a groove with a curved bottom, wherein the diameter of the pipe section, beginning at this groove increases to the edge of the first sidewall of the groove forming the sealing seat. The bottom of the groove forming the sealing seat is positioned at a greater diameter of the pipe section than the bottom of the other groove forming the mounting seat. dr

BRIEF DESCRIPTION OF THE DRAWING

In the drawing:

FIG. 2 shows on an enlarged scale a detail of a pipe section with sealing ring in the mounting position and in the sealing position;

FIG. 3 shows a detail of a further embodiment of the clamping device connecting the flanges;

FIG. 4.shows a detail of yet another embodiment of the clamping device connecting the flanges; and FIG. 5 illustrates the assembly process of the two flanges with a two-part sealing ring; and FIG. 6 illustrates the assembly process for the two flanges with a single-part sealing ring.

DESCRIPTION OF THE PREFERRED EMBODIMENTS

Figure 1:
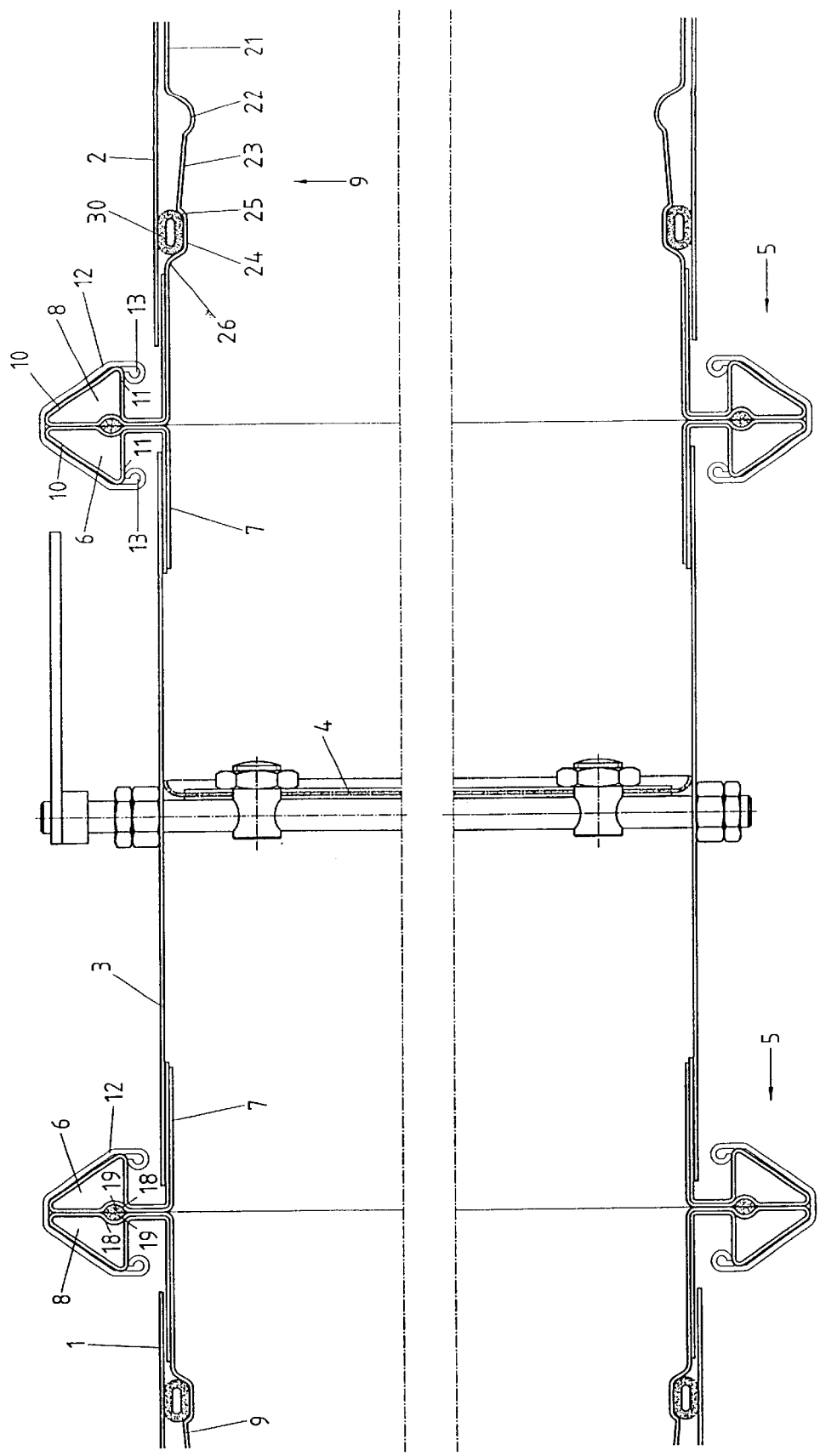
FIG. 1 is a detail of the pipeline with a flange connection according to the invention shown in axial section.

A tubular housing 3 for a throttle flap 4 is mounted between two pipe ends 1 and 2 by means of flange connections 5.

The ends of the housing 3 are provided by the manufacturer with flanges 6 such that a pipe socket 7 formed on the flange 6 has been inserted into the ends of the housing 3 and then fixedly connected to the housing 3, for example, by welding or lock-seaming.

The counter members to the flanges 6 are provided in the form of flanges 8 provided on pipe sections of a plug connection member 9. The flanges 8 are arranged on the pipe ends 1 or 2 by insertion of the plug connection members 9, respectively.

The flanges 6 and 8 are formed, respectively, of sheet metal such that they are bent back at the outer rim of their contact surfaces provided on their end faces and are angled with formation of a slanted surface 10 which ends with a step 11. The two slanted surfaces 10 and the steps 11 provided at the abutting flanges 6, 8 make it possible to connect these two flanges 6, 8 to one another in different ways.

According to FIG. 1, clamping devices in the form of clamps 12 distributed about the circumference of the flanges are placed onto the flanges 6 and 8 so as to embrace them and complete the flange connection 5. The clamps 12 are bent at their ends about a three-quarter circle to form eyes 13 which snap like hooks into place under the steps 11.

According to FIG. 3, clamping devices in the form of clamps 14 can be mounted on the flanges 6, 8 for completing the flange connection and can be removed by means of a lever grip 15. The lever handle 15 is formed as an extension of one eye 16 of the clamping which is formed differently than the eyes 13. The configuration is such that, when releasing or opening the clamp 14, the lever handle 15 not only pulls on the clamp 14 but also deforms the eye 16 slightly in the sense of opening the hook or snap connection. However, the lever handle 15 can also be employed for mounting the clamp.

According to FIG. 4 the slanted surfaces 10 of the flanges 8 and 6 are used for forming the flange connection by placing a clamping device in the form of a clamping bracket 17, formed as a cross-sectionally matching counter member to the two flanges 6, 8, onto the abutting flanges 6, 8 and closing (tightening) it.

In the end face of the flanges 6 and 8 forming the contact surface, an annularly extending groove 18 for receiving the second sealing ring is formed. According to FIGS. 1 and 5, the two-part sealing ring is comprised of two lens-shaped parts 19 inserted and glued into the annularly extending grooves 18.

According to FIG. 6 only one of the annularly extending grooves 18 has a single-part sealing ring 20 inserted and glued thereto.

The plug connection members 9 with the flanges 8 are profiled as follows.

A recess with a groove 22 is provided adjoining a cylindrical end portion 21 and forms the mounting seat for the sealing ring 30 which is in the form of a thick-walled rubber hose. Adjacent thereto a conically widening portion 23 is provided. At its end a groove 24 with a flat bottom and two sidewalls 25 and 26 is provided as a sealing seat for the sealing ring 30.

When inserting the plug connection member 9 into the pipe end 1 or 2, the end edge of the pipe end 1 or 2, as illustrated in FIG. 2 to the left, contacts the not yet deformed sealing ring 30 positioned in the groove 22. The pipe end 1 or 2 rolls the sealing ring 30, compressing it in the process, and rolls it out of the groove 22 and across the portion 23 into the groove 24. By doing so, the pipe end 1 or 2 is pushed across the sealing ring 30 (viewed as a relative movement). Once the sealing ring 30 snaps into the groove 24, whose two sidewalls 25 and 26 secure it therein, the end position of the insertion movement has been reached and the sealing ring 30 is in its sealing position. The plug connection member 9 and the pipe end 1 or 2 can no longer move further relative to one another because the sealing ring 30 cannot roll across the high sidewall 26 of the groove 24 and the friction force of the compressed sealing ring 30 on the pipe wall prevents sliding because of the high frictional coefficient of the pairing rubber/metal.

A return movement, in which the sealing ring 30 must pass, as a threshold, across the sidewall 25 of the groove 24 with further great compression, is counteracted by an extremely high securing force of the sealing ring 30.

The force flow, in general, corresponds to that indicated by the arrows 27 and 28 in FIG. 2. The force introduced via the pipe wall as a result of the friction is supported on the sidewall 25 of the groove 24. Therebetween mainly the relatively thick hose wall and only a small portion of the hollow space of the hose are positioned. The hose wall of solid material provides a significantly stronger and safer support than the same cross-sectional area in the case of a sealing ring made of foamed material with a completely filled cross-section (no hollow space).

While specific embodiments of the invention have been shown and described in detail to illustrate the inventive principles, it will be understood that the invention may be embodied otherwise without departing from such principles.

What is claimed is:

1. A flange connection for pipes, the flange connection comprising a plug connection member comprised of a pipe section and a flange connected to one end of the pipe section, wherein the pipe section has a mounting seat and a sealing seat, wherein the plug connection member further comprises a first sealing ring seated in an initial position in the mounting seat, wherein the first sealing ring is configured to roll from the mounting seat into the sealing seat and into a sealing position when the pipe section is inserted into a pipe end, wherein the flange has an end face with an outer rim and widens from the outer rim radially inwardly in an axial direction of the pipe section and forms a step proximal to the pipe section, wherein the flange connection further comprises a counter member, having a counter flange shaped identically to the flange of the plug connection member, and a clamping device having a cross-section matching a cross-section of the flange of the plug connection member and of the counter flange when positioned with the end faces in an abutting position, wherein the clamping device is configured to clamp the flange and counter flange against one another in the abutting position for securing the flange connection.

2. The flange connection according to claim 1, wherein the clamping device is a clamp having eye-shaped ends and wherein the clamp is configured to be slipped onto the flange and the counter flange in the abutting position and wherein the eye-shaped ends are configured to engage the steps of the flange and the counter flange.

3. The flange connection according to claim 2, wherein the clamp has a lateral extension connected to one of the eye-shaped ends and configured to provide a lever handle.

4. The flange connection according to claim 1, wherein the end faces of the flange and the counter flange each have annularly extending grooves facing one another in the abutting position, wherein the flange connection comprises a second sealing ring positioned in the annularly extending grooves.

5. The flange connection according to claim 4, wherein the second sealing ring is comprised of a first part and a second part, wherein the first part is seated in the annularly extending groove of the flange and the second part is positioned in the annularly extending groove of the counter flange, wherein the first and second parts project from the annularly extending grooves, in which the first and second parts are seated, respectively, past the end faces.

6. The flange connection according to claim 1, wherein the first sealing ring is a hose comprised of a material having a hardness of greater than 30 Shore.

7. The flange connection according to claim 6, wherein the material of the hose has a hardness of 40 to 70 Shore.

8. The flange connection according to claim 7, wherein the material of the hose has a hardness of 50 to 60 Shore.

9. The flange connection according to claim 6, wherein the material of the hose is a solid material.

10. The flange connection according to claim 6, wherein the hose has a wall thickness of 20 to 25% of a diameter of the hose.

11. The flange connection according to claim 1, wherein the first sealing ring in the sealing position is compressed to a height of 55 to 70% of a diameter of the first sealing ring in the initial position.

12. The flange connection according to claim 11, wherein the first sealing ring in the sealing position is compressed to a height of 60 to 65% of the diameter of the first sealing ring in the initial position.

13. A flange connection for pipes, the flange connection comprising a plug connection member comprised of a pipe section and a flange connected to one end of the pipe section, wherein the pipe section has a mounting seat and a sealing seat, wherein the plug connection member further comprises a first sealing ring seated in an initial position in the mounting seat, wherein the first sealing ring is configured to roll from the mounting seat into the sealing seat and into a sealing position when the pipe section is inserted into a pipe end, wherein the sealing seat is a first groove formed in the pipe section, wherein the first groove has a first sidewall proximal to the mounting seat across which first sidewall the first sealing ring rolls when rolling from the mounting seat into the sealing seat, wherein the first sidewall has a height of 25 to 30% of a height of the sealing ring in the sealing position, and wherein the first groove has a flat bottom.

14. The flange connection according to claim 13, wherein the first groove has a second sidewall and wherein the second sidewall is higher than the first sidewall.

15. The flange connection according to claim 14, wherein the second sidewall is approximately twice as high as the first sidewall.

16. The flange connection according to claim 14, wherein the first and second sidewalls surround and contact the hose.

17. A flange connection for pipes, the flange connection comprising a plug connection member comprised of a pipe section and a flange connected to one end of the pipe section, wherein the pipe section has a mounting seat and a sealing seat, wherein the plug connection member further comprises a first sealing ring seated in an initial position in the mounting seat, wherein the first sealing ring is configured to roll from the mounting seat into the sealing seat and into a sealing position when the pipe section is inserted into a pipe end, wherein the sealing seat is a first groove formed in the pipe section, wherein the first groove has a first sidewall proximal to the mounting seat across which first sidewall the first sealing ring rolls when rolling from the mounting seat into the sealing seat, wherein the first sidewall has a height of 25 to 30% of a height of the sealing ring in the sealing position, wherein the mounting seat is a second groove with a curved bottom and wherein a portion of the pipe section extending between the first and second grooves has a diameter that increases from the second groove to the first sidewall of the first groove, wherein a bottom of the first groove is located at a diameter of the pipe section that is greater than the diameter of the pipe section where the curved bottom of the second groove is located.

* * * * *